(12) United States Patent
Cai

(10) Patent No.: US 12,335,425 B2
(45) Date of Patent: Jun. 17, 2025

(54) MULTI-SCREEN DISPLAY

(71) Applicant: Shenzhen DeOne Innovation Technology Co., ltd, Shenzhen Guangdong (CN)

(72) Inventor: Jiongjun Cai, Shenzhen Guangdong (CN)

(*) Notice: Subject to any disclaimer, the term of this patent is extended or adjusted under 35 U.S.C. 154(b) by 0 days.

(21) Appl. No.: 18/533,307

(22) Filed: Dec. 8, 2023

(65) Prior Publication Data

US 2024/0419385 A1    Dec. 19, 2024

(30) Foreign Application Priority Data

Jun. 16, 2023    (CN) .......................... 202321546778.3

(51) Int. Cl.
| | |
|---|---|
| *G06F 1/16* | (2006.01) |
| *G06F 3/14* | (2006.01) |
| *H04M 1/02* | (2006.01) |
| *H04M 1/12* | (2006.01) |

(52) U.S. Cl.
CPC ........ *H04M 1/0283* (2013.01); *G06F 1/1681* (2013.01); *G06F 3/1431* (2013.01); *H04M 1/12* (2013.01); *H04M 2201/08* (2013.01)

(58) Field of Classification Search
CPC .... G06F 3/1431; G06F 1/1681; G06F 3/1454; G06F 1/1626
USPC ......................................... 345/100
See application file for complete search history.

(56) References Cited

U.S. PATENT DOCUMENTS

| | | | |
|---|---|---|---|
| 2002/0109662 A1* | 8/2002 | Miller ................. | G06F 3/1431 |
| | | | 345/100 |
| 2017/0185363 A1* | 6/2017 | Ting ..................... | G06F 1/1626 |
| 2023/0044946 A1* | 2/2023 | Watamura ............ | G06F 1/1626 |
| 2023/0350631 A1* | 11/2023 | Huang .................. | G06F 3/1454 |

* cited by examiner

*Primary Examiner* — Abdul-Samad A Adediran

(57) ABSTRACT

A multi-screen display is disclosed, including a plurality of articulated displays, and one of the displays is signal connected to an external electronic device, so that the external electronic device can be used to control entire display screens of the multi-screen display via only one transmission line. The multi-screen display is configured with a switching member for manipulation by a user to switch display modes of all displays, and the display modes include a split screen mode and a large screen mode, so as to satisfy different usage requirements of the user. The multi-screen display has advantages that displaying screens of all displays via only one transmission line and switching the display modes of all displays in conjunction with the switching member.

3 Claims, 4 Drawing Sheets

MULTI-SCREEN DISPLAY

TECHNICAL FIELD

The present application relates to the technical field of display devices, and specifically to a multi-screen display.

BACKGROUND

Portable displays, in consideration of portability, are generally not made very large. However, sometimes multiple auxiliary screens and large auxiliary displays are needed, so that the current portable displays are difficulty to meet such requirements.

Therefore, for more than one auxiliary screen, there are currently two main solutions, option 1, two transmission lines are connected to two displays respectively; option 2, only one single transmission line through an USB interface by using Displaylink technology solution to achieve video output. While the two solutions have several disadvantages, for example, option 1 requires a computer host to have multiple video output interfaces and multiple video cables requirements; option 2 converts a USB signal into a video signal for transmission, requiring installation of software to operation, which is too complex for a Windows system host. In addition, the two solutions do not have functions of switching split screen or large screen.

SUMMARY

In view of defects and deficiencies of the existing technologies, the present disclosure provides a novelty multi-screen display that has advantages of displaying screens of all displays via only one transmission line by setting multiple interfaces with different specifications on one display, and also switching display modes of all displays in conjunction with a switching member.

To achieve above objectives, the present disclosure adopts following technical solutions. In some embodiments of the present disclosure, a multi-screen display is provided, including a plurality of displays articulated with each other, and one of the displays is signal connected to an external electronic device for controlling display screens of all displays. The multi-screen display is configured with a switching member for manipulation by a user to switch display modes of all displays, and the display modes include a split screen mode and a large screen mode.

The multi-screen display includes a first display and a second display, and the second display is configured with a plurality of interfaces of different specifications.

The interfaces include a DP interface and a Displaylink video connection interface.

The first display is disposed on the second display, and the second display is provided with a support structure configured to support the multi-screen display. The support structure is a support plate hinged on a back of the second display.

The support plate is hinged with a secondary plate, and a rotating centerline of the secondary plate is provided at an angle to a rotating centerline of the support plate.

The switching member is a key set on the multi-screen display.

The split screen mode is configured to provide discontinuous pictures for different displays, and the large screen mode is configured to provide continuous pictures for the different displays.

The support structure includes a magnetic portion partially magnetized to the back of the second display and a support frame.

The support frame is hinged with the magnetic portion.

With adoption of the above technical solutions, the present disclosure has at least following advantages. Herein one of the displays of the multi-screen display is configured with a plurality of interfaces with different specifications, which can be adapted to various external electronic devices by plugging in different interfaces via a transmission line, so that only one transmission line can enable the external electronic devices to control entire display screens of the multi-screen display. Moreover, the multi-screen display is configured with the switching member that can be manipulated by the user to adjust display modes of all displays, the display modes includes a split screen mode and a large screen mode, so as to satisfy different usage requirements of the user.

BRIEF DESCRIPTION OF THE DRAWINGS

In order to more clearly illustrate the technical solutions in embodiments of the present disclosure and the existing technologies, the following will briefly describe accompanying drawings that need to be used in the description of the embodiments or the existing technologies. It will be obvious that the accompanying drawings in the following description are only some of the embodiments of the present disclosure, and for one person of ordinary skill in the art, other accompanying drawings can be obtained based on these drawings without paying creative laboriousness.

Figure 1:
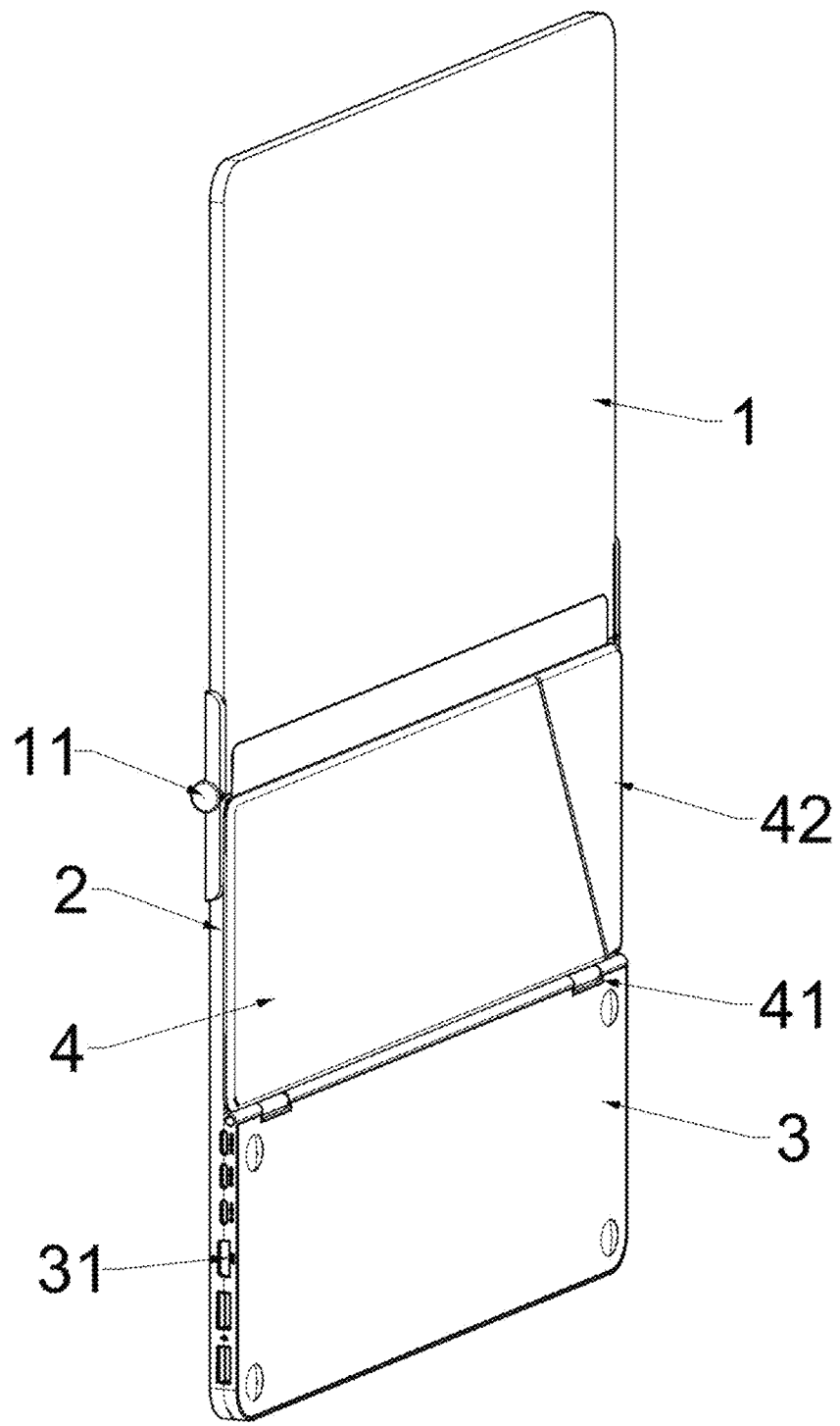
FIG. 1 shows a structural schematic diagram of a multi-screen display in accordance with some embodiments of the present disclosure.

In the drawings, reference signs are as follows. 1. first display, 11. first hinged portion, 2. second display, 3. host, 4. support plate, 41. second hinged portion, 42. secondary plate, 5. external electronic device, 51. transmission line, 6. support frame, 61. magnetic portion, 62. third hinged portion.

DETAILED DESCRIPTION OF THE EMBODIMENTS

The present disclosure will be described in further detail below in conjunction with the accompanying drawings.

Specific embodiments are only an explanation of the present disclosure, which is not a limitation of the present disclosure, after reading of this specification the person of ordinary skill in the art can make modifications to the embodiments without creative contribution as needed, which are protected by the patent law as long as it falls within the scope of the claims of the present disclosure.

Figure 2:
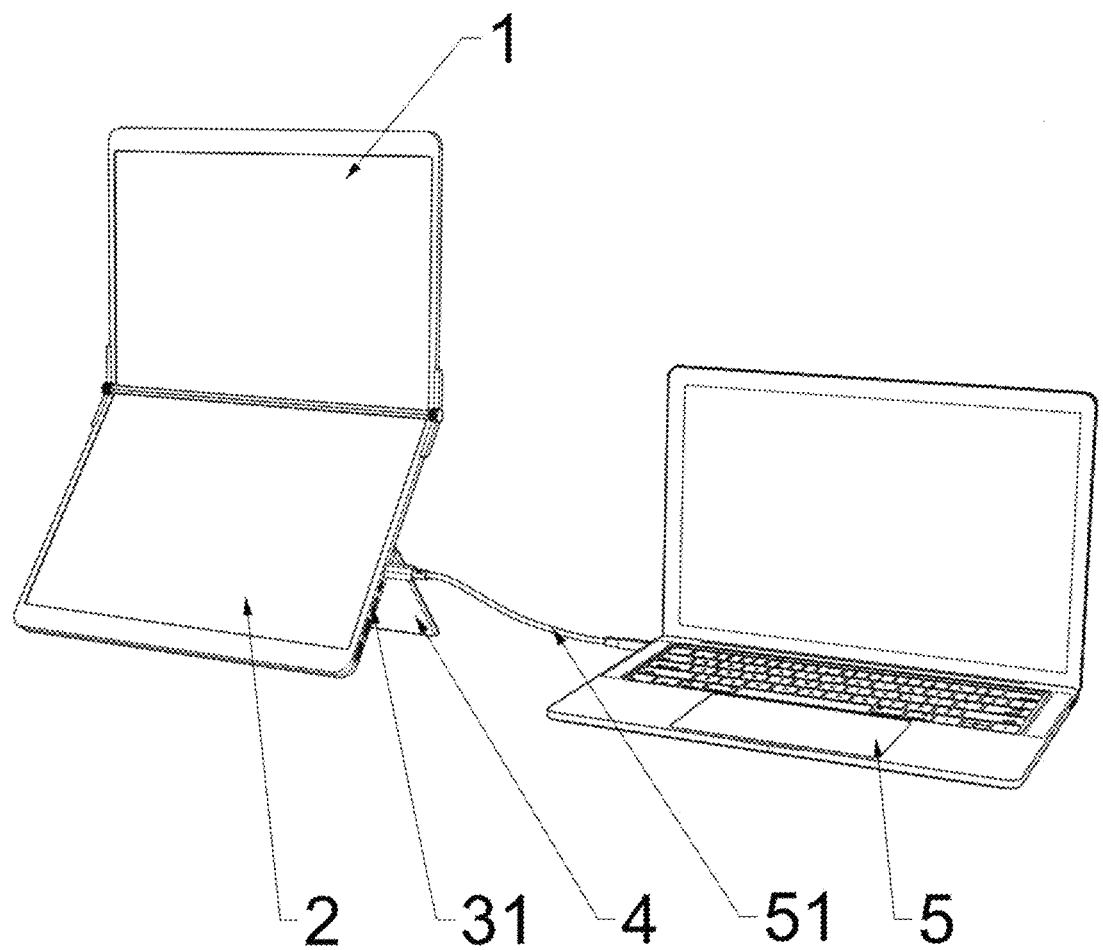
FIG. 2 shows a schematic diagram of a first use state of the multi-screen display in accordance with some embodiments of the present disclosure.

In some embodiments of the present disclosure, as shown in FIG. 1 and FIG. 2, a multi-screen display is provided, including a plurality of displays, and each of adjacent displays is articulated with each other, so that it is facilitate to rotate to adjust orientation of different displays, thereby adapting to a variety of different use scenarios. Herein one of displays of the multi-screen display is configured with a host 3 at its back, the host 3 is electrically connected to all displays to control display screens thereof. The host 3 is signal connected to the external electronic device 5 to enable the external electronic device 5 to control the entire multi-screen display.

In some preferred embodiments of the present disclosure, the multi-screen display is configured with a switching member for manipulation by a user to switch display modes of the displays, and the display modes include a split screen mode and a large screen mode, so as to satisfy different usage requirements of the user. In the embodiments, the split screen mode is configured to provide discontinuous pictures for different displays, for example, one display is played a video and the other display is displayed an e-book. The large screen mode is configured to provide continuous pictures for the different displays, for example, pictures played by several displays are spliced into complete video pictures. Moreover, the adjacent displays are coupled and connected to each other for signal and data transmission.

In some embodiments of the present disclosure, the multi-screen display includes two displays, one of which is a first display 1 and the other is a second display 2. The second display 2 is configured with a plurality of interfaces of different specification to enable the external electronic device 5 to achieve signal transmission by plugging only one transmission line with corresponding interface. Specifically, the host 3 is provided at the back of the second display 2, and the interfaces are correspondingly provided at the side of the host 3. The first display 1 is coupled with the second display 2 so as to realize signal and data transmission between the two.

It should be added that the interfaces include, but are not limited to, a USB-C interface, a DP interface, and a Displaylink video connection interface. The DP interface can be directly connected to a Windows laptop and use a DP protocol to directly perform MST video output, which can also be used to realize SST video output mode on the Mac. The Displaylink video connection interface needs to install software and convert a USB signal to a video signal for transmission, so as to realize a MST video output mode on Mac. Specifically, the DP interface refers to DisplayPort display communication port, the MST video output refers to multi-stream video transmission achieved by only one line, the Mac refers to Apple computers, the SST video output mode refers to dual-screen same extended picture mode, the MST video output mode refers to dual-screen heterodyne extended picture mode.

Figure 3:
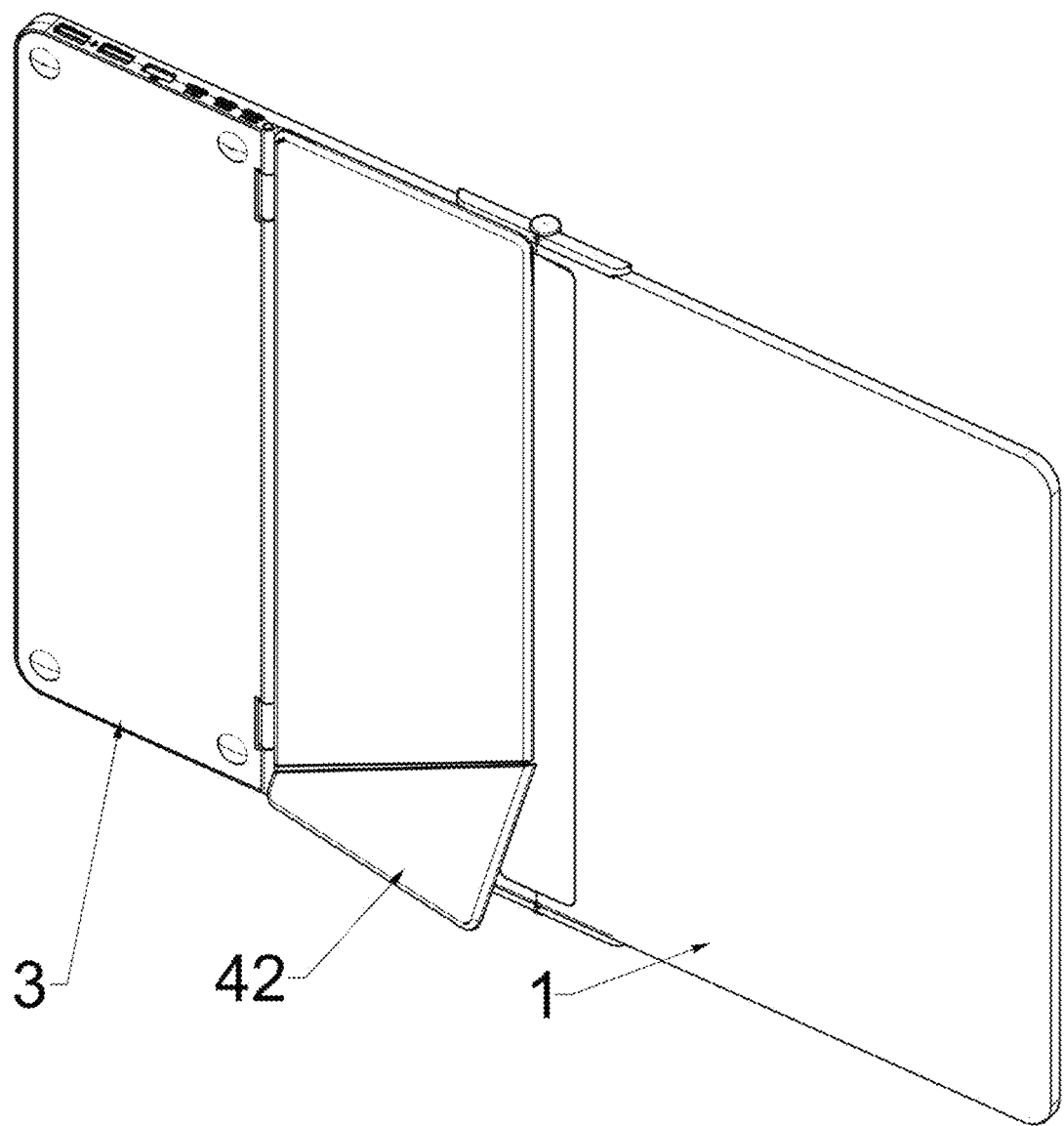
FIG. 3 shows a schematic diagram of a second use state of the multi-screen display in accordance with some embodiments of the present disclosure.

As shown in FIG. 3, the first display 1 is disposed on the second display 2, and a first hinged portion 11 is provided at a connection between the two for the first display 1 to be expanded up and down or collapsed with respect to the second display 2. The second display 2 is provided with a support structure, a part of the support structure is connected to the second display 2 and another part is in contact with a support surface so as to support the multi-screen display, and the support surface is a desktop or a floor.

In some embodiments of the present disclosure, the support structure is a support plate 4 hinged to the back of the second display 2, a second hinged portion 41 is provided between one side of the support plate 4 and the second display 2, and the other side of the support plate 4 is configured to support with the support surface, thereby supporting the entire multi-screen display. A rotating centerline of the second hinged portion 41 is parallel to a rotating centerline of the first hinged portion 11. In another method of use, a secondary plate 42 is provided at a lower portion of the support plate 4, and the secondary plate 42 is rotationally connected to the support plate 4, the two displays can be supported when the two displays are placed side-by-side only by unfolding the secondary plate 42. The rotating centerline of the secondary plate 42 is provided at an angle to the rotating centerline of the support plate 4. It is to be noted that the angle may be 70° or 80°.

Figure 4:
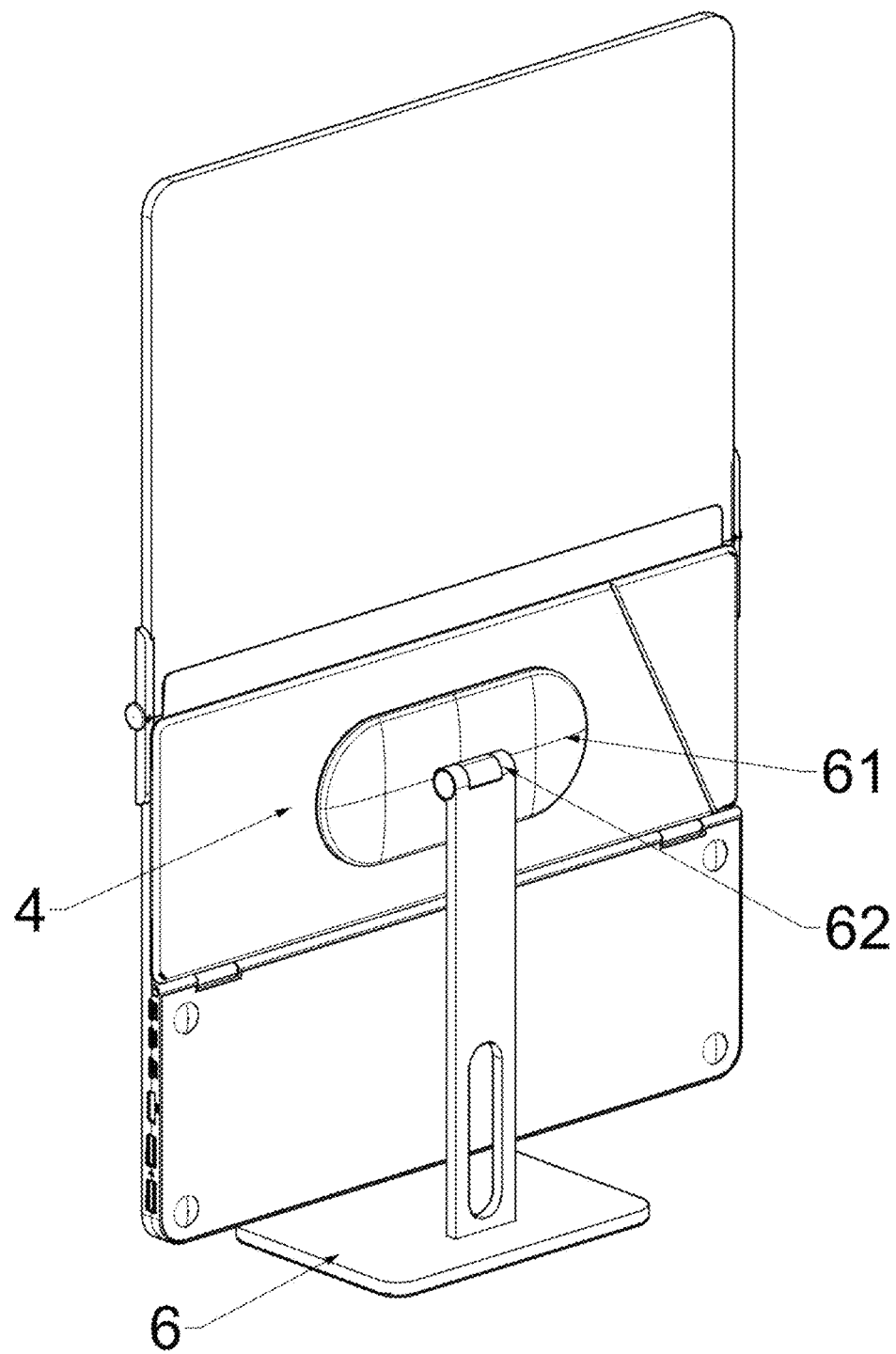
FIG. 4 shows a schematic diagram of a third use state of the multi-screen display in accordance with some embodiments of the present disclosure.

As shown in FIG. 4, in some another embodiments of the present disclosure, the support structure includes a magnetic portion 61 partially magnetized to the back of the second display 2 and a support frame 6, the magnetic portion 61 can be used for magnetic connection between the second display 2 and the support structure. The support frame 6 can support the second display 2 adsorbed on the magnetic portion 61 to realize the support of the entire multi-screen display. The magnetic portion 61 specifically magnetically cooperates with the support plate 4 at the back of the second display 2. A third hinged portion 62 is provided between the support frame 6 and the magnetic portion 61, so that an orientation of the second display 2 can be adjusted. The magnetic portion 61 is preferably a magnet, and the support plate 4 at the back of the second display 2 is made of a metal that magnetically cooperates with the magnet, the metal is preferably carbon steel.

In some preferred embodiments of the present disclosure, the switching member is a key set on the multi-screen display, and the user can realize the mode switching of the multi-screen display by pressing the key.

In the embodiments of the present disclosure, the first hinged portion includes a locating shaft provided between the first display and the second display and two rotary seats provided in a stack, the two rotary seats are configured for the locating shaft to be threaded therein, so that the two rotary seats can be rotated along a shaft axis of the locating shaft, herein one of the rotary seats is connected to the first display, and the other of the rotary seats is connected to the second display. The second hinged portion includes a pivot seat disposed on the second display and a pivot shaft disposed on the support plate, the pivot shaft goes across a pivot hole reserved on the therein, so as to realize a rotational connection between the second display and the support. The third hinged portion includes a pivot seat disposed on the support plate and a pivot shaft disposed the secondary plate, the pivot shat goes across a pivot hole reserved on therein, so as to realize a rotational connection between the secondary plate and the support plate.

The above description only for the purpose of illustrating the technical solutions of the present disclosure rather than limitation, other modifications or equivalent substitutions made to the technical solutions of the present disclosure by the person of ordinary skill in the art, as long as they do not deviate from the spirit and scope of the technical solutions of the present disclosure, should be covered by the scope of the claims of the present disclosure.

What is claimed is:

1. A multi-screen display, comprising a plurality of displays articulated with each other;

wherein one of the displays is signal connected to an external electronic device for controlling display screens of all displays;

wherein the multi-screen display is configured with a switching member for manipulation by a user to switch display modes of all displays, and the display modes comprise a split screen mode and a large screen mode;

wherein the switching member is a key set on the multi-screen display;

wherein the split screen mode is configured to provide discontinuous pictures for different displays, and the large screen mode is configured to provide continuous pictures for the different displays;

wherein the multi-screen display comprises a first display and a second display, and the second display is configured with a plurality of interfaces of different specifications;

wherein the first display is disposed on the second display, and the second display is provided with a support structure configured to support the multi-screen display;

wherein the support structure is a support plate hinged on a back of the second display; and, wherein the support structure comprises a magnetic portion partially magnetized to the back of the second display and a support frame.

2. The multi-screen display according to claim 1, wherein the support plate is hinged with a secondary plate, and a rotating centerline of the secondary plate is provided at an angle to a rotating centerline of the support plate.

3. The multi-screen display according to claim 1, wherein the support frame-is hinged with the magnetic portion.

\* \* \* \* \*